Dec. 30, 1969 J. P. BARLOW ET AL 3,487,373

APPARATUS PROVIDING SYMBOLIC MEMORY ADDRESSING
IN A MULTICOMPUTER SYSTEM

Filed Nov. 16, 1965

INVENTORS
J. P. BARLOW
R. BARTON
J. E. BELT
C. R. FRASIER
L. A. HITTEL
L. L. RAKOCZI
M. A. TORFEH
J. B. WIENER

BY
Louis P. Ellinger

United States Patent Office 3,487,373
Patented Dec. 30, 1969

3,487,373

APPARATUS PROVIDING SYMBOLIC MEMORY ADDRESSING IN A MULTICOMPUTER SYSTEM

Jesse P. Barlow, Reseda, Calif., Richard Barton and John E. Belt, Phoenix, Carlton R. Frasier, Glendale, and Lorenz Alvin Hittel and Laszlo L. Rakoczi, Phoenix, Ariz., Mark A. Torfeh, Tarzana, Calif., and Jerome B. Wiener, Armonk, N.Y., assignors to General Electric Company, a corporation of New York Filed Nov. 16, 1965, Ser. No. 508,168
Int. Cl. G11b *13/00;* G06f *1/00, 7/00*
U.S. Cl. 340—172.5 28 Claims

ABSTRACT OF THE DISCLOSURE

Apparatus is disclosed for translating a symbolic block address into an actual block address. In an exemplary environment, each block comprises a predetermined number of words stored in a corresponding plurality of contiguous addressable cells in a data storage system. A data processing unit requiring communication with the data storage system issues a group of signals symbolically representing a block address to the address translator. In the exemplary address translator, decoding provides a unique signal which is encoded into an actual block address through an encoder. The encoder may be of fixed or alterable configuration according to system requirements. The actual block address is presented to the data storage system in conjunction with lower order address information to specify an actual unique address for a cell. Priority selection means are provided for systems utilizing a plurality of data processing units with a single address translator.

This invention relates to multicomputer systems and more particularly to apparatus for exercising management control of a multicomputer system.

A multicomputer system comprises a plurality of data processing units, a plurality of data storage units, and a plurality of input devices and output devices. The data processing units process data by executing separate programs simultaneously and independently of each other. The data storage units store data to be processed, data which is the result of processing, and programs for controlling the processing operations of the data processing units. The input devices supply programs and data to be processed and the output devices receive and utilize processed data. Communication must be provided for the data processing units to receive programs and data to be processed from the data storage units and to transmit processed data to the data storage units. Communication must also be provided for the input devices to transmit programs and data to be processed to the data storage units and for the output devices to receive processed data from the data storage units.

The apparatus of the instant invention provides management control for such a multicomputer system. Generally, management control of the multicomputer system described comprises expeditiously supplying data to be processed and the programs providing the required data processing functions to the data processing units, and efficiently controlling the output devices to receive and utilize the processed data. This management control is effected by providing and controlling all required communications between data processing units and data storage units and between input and output devices and data storage units; by providing for the assignment of programs to data processing units for execution in accordance with the required urgencies for execution of the different programs, the availability of the required input and output devices, the availability of the required data storage space in the data storage units, and the relative capabilities of the data processing units for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the data processing units, or when the data processing units become partially or totally inoperative; etc.

Each data processing unit of a multicomputer system executes a program independently of the programs being executed by the other data processing units. The program comprises a set of instructions, each instruction specifying a discrete type of processing operation. A data processing unit executes a program by sequentially responding to each of the instructions of the program to perform the corresponding operations. The data processing unit obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processing unit supplies the correspoinding addresses in sequence. Additionally, many of the instructions during execution require the data processing unit to further communicate with the data storage system, either to obtain a data item on which the data processing unit is to perform an operation or to store a data item which is the result of an operation. Accordingly, each instruction requiring a transfer of a data item between the data processing unit and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

A program is only executed by the multicomputer system after it has been presented for execution by an input device. An advanced form of management control provides most effective and efficient execution of the waiting programs if, instead of waiting for the availability of specific storage space, each waiting program is accepted from an input device and transferred to the data storage system as soon as the data storage system has free any storage space which is of sufficient capacity and which is provided by the required combination of data storage unit types. After transfer to the data storage system these programs are executed according to their relative urgencies and the availability of the input and output devices required by each program.

However, in utilizing this advanced form of management control of the particular portion of the data storage system in which a program is to be stored and executed is not determinable when the program is prepared or when it is being presented by an input device; instead, the storage portion to be employed varies according to the other programs already present when a program is accepted into the data storage system. Accordingly, the instructions in each program which identify data storage system cells can identify neither specific data storage units nor specific cells in a data storage unit; instead, the instructions can identify only symbolically the relative disposition of the cells in which the program is to be executed. In obtaining the instructions of the program in proper sequence, the data processing unit must employ in sequence symbolic identifications, or symbolic addresses, of cells appropriately disposed relative to the cells identified by the symbolic addresses provided by the instructions. Additionally, the symbolic addresses supplied by a data processing unit during execution of a program will identify symbolically a contiguous set of data storage system cells within which the instructions, the data items to be processed, and the processed data items are stored or to be stored.

To realize the greatest benefits from the above-described advanced form of management control for a multicomputer system apparatus should be provided for simply, reliably and rapidly converting the symbolic identifications of the storage cells supplied by the programs and the data processing units into corresponding actual addresses of the storage cells in which the instructions of the program, the data items to be processed, and the processed data items are stored or to be stored.

Therefore, it is an object of this invention to provide management control apparatus for implementing the effective and efficient execution of the programs of a multicomputer system.

Another object of this invention is to provide apparatus for enabling the execution of a program in a multicomputer system with respect to different portions of the data storage system.

Another object of this invention is to provide apparatus for enabling communication between a data storage system and a data processing unit which symbolically identifies locations in the data storage system.

Another object of this invention is to provide a data processing system wherein the programs which are executed identify symbolically the cells of the data storage system.

Another object of this invention is to provide a data processing system wherein the instructions of a program which is executed, symbolically identify, in part, the cells of the data storage system.

The foregoing objects are achieved, according to one embodiment of the instant invention, by providing a multicomputer system wherein symbolic data storage system identifications supplied by a data processing unit during execution of a program are applied to a translating apparatus, and wherein the translating apparatus translates the symbolic identifications to actual designations of specific cells in specific data storage units. A data transmission member provides selective and controllable communication between the plurality of data processing units and the plurality of data storage units of the multicomputer system. When a data processing unit is to communicate with the data storage system to receive an instruction, to receive a data item to be processed or to transmit a processed data item, the data processing unit supplies a signal group symbolically representing the address of a cell in the data storage system. An address translating device is coupled to the data processing units for receiving these symbolic addresses. Upon receiving each symbolic address, the address translating device responds to generate a corresponding signal set which represents a specific cell in a specific data storage unit. The signal set so generated comprises an identification signal, which identifies a particular one of the data storage units, and a signal group representing the actual address of one of the cells in the identified data storage unit. Following generation of a signal set by the address translating device, the identification signal controls additional apparatus to provide transfer of the actual address to the data storage unit designated by the identification signals. Upon receiving an actual address, a data storage unit initiates an operation to provide the required communication between the specifically addressed cell thereof and the initiating data processing unit through the data transmission member.

J. R. Hudson, L. L. Rakoczi, and D. L. Sansbury, as defined by the claims of their application, Ser. No. 646,504, filed June 16, 1967; all such applications being assigned to the assignee of the present application.

DESCRIPTION OF DRAWINGS

The invention will be described with reference to the accompanying drawings, wherein.

Figure 1:
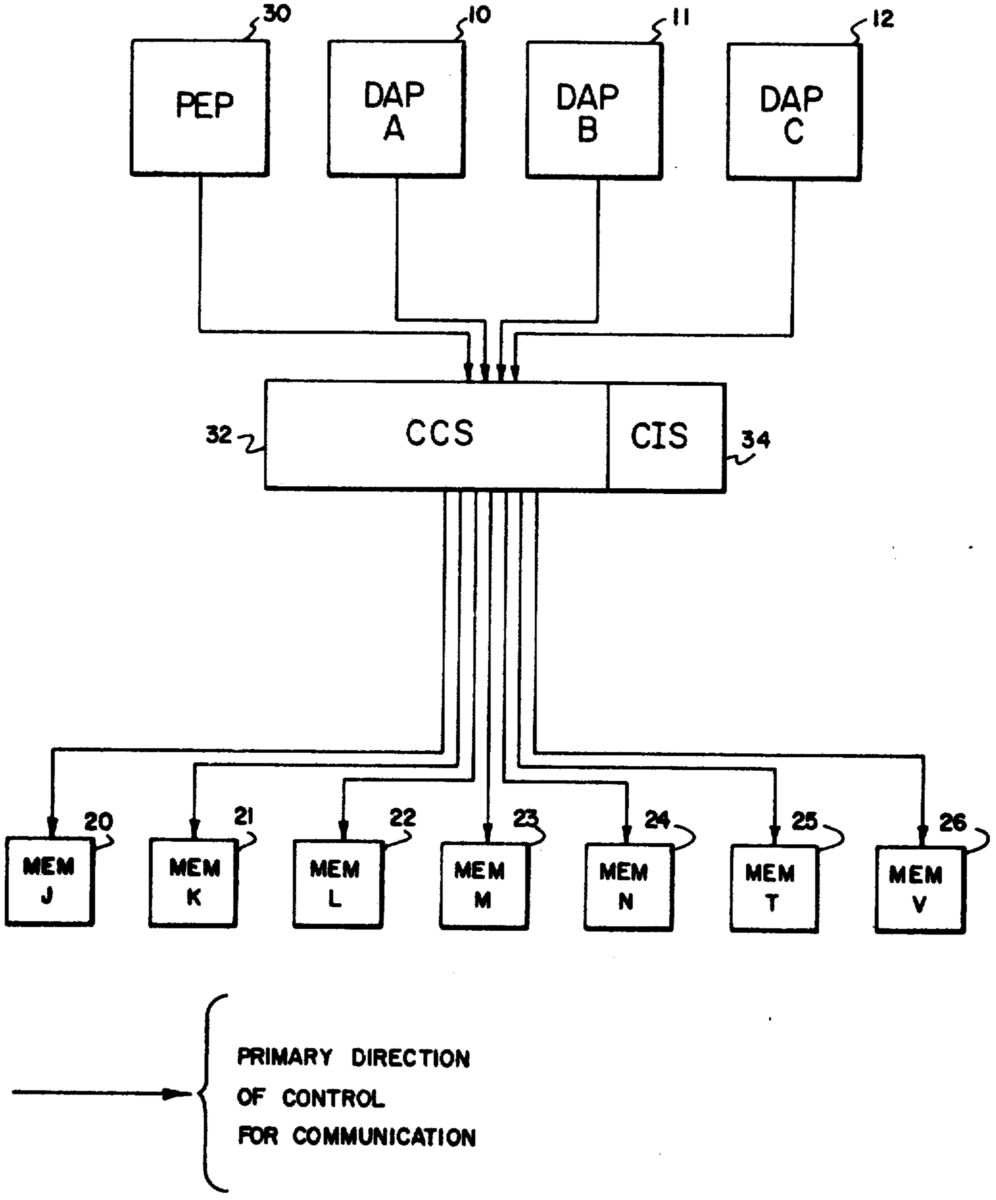
FIGURE 1 is a block diagram of a Multicomputer Data Processing System to which the instant invention is applicable.

For a complete description of the system of FIGURE 1 and of my invention, reference is made to U.S. patent application, Ser. No. 542,768, filed Apr. 15, 1966, now Patent No. 3,444,525, entitled "Centrally Controlled Multicomputer System" by Jesse P. Barlow, Richard Barton, John E. Belt, Carlton R. Frasier, Lorenz A. Hittel, Laszlo L. Rakoczi, Mark A. Torfeh, and Jerome B. Wiener, and assigned to the assignee of the present invention. More particularly, attention is directed to FIGURES 2 through 110 of the drawings and to the specification beginning at col. 9, line 18, and ending at col. 173, line 9, inclusive of U.S. patent application, Ser. No. 542,768, now Patent No. 3,444,525 which are incorporated herein by reference and made a part hereof as is fully set forth herein.

What is claimed is:

1. A data processing system comprising: a data word transmission member; a data storage member including a plurality of addressable storage cells; a data processing unit for receiving data words from said data word transmission member, for performing a plurality of different operations on received data words, and for transferring data words representing results of the operations to said data word transmission member, said data processing unit including means for supplying a first signal group symbolically representing an address of a cell in said data storage member when said data processing unit is to communicate with said data storage member; means included in said data storage member responsive to a second signal group representing the actual address of one of said cells for transferring a data word between said cell and said data word transmission member; an address translating device coupled to said data processing unit, said address translating device including means to receive said first signal group and responsive thereto for translating said first signal group into said second signal group; and coupling means for delivering said second signal group to said data storage member.

2. A data processing system comprising: a data word transmission member; a plurality of data storage members, each of said data storage members including means for storing a data word in each one of a respective plurality of addressable storage cells; a data processing unit for receiving data words from said data word transmission member, for performing a plurality of different operations on received data words, and for transferring data words representing the results of the operations to said data words transmission member, said data processing unit including means for supplying a first signal group symbolically representing an address of a cell in said plurality of said data storage members when said data processing unit is to communicate with said data storage members; means included in said data storage members responsive to a second signal group representing the actual address of one of said cells for transferring a data word between said cell and said data word transmission member; an address translating device coupled to said data processing unit, said address translating device including means to receive said first signal group and responsive thereto for translating said first signal group into said second signal group; and coupling means for delivering said second signal group to said plurality of data storage members.

3. A data processing system comprising: a data word transmission member; a data storage member including a plurality of addressable storage cells; a plurality of data processing units for receiving data words, for performing a plurality of different operations on received data words, and for transferring data words representing the results of the operations to said data words transmission member, each of said data processing units including means for supplying a first signal group symbolically representing an address of a cell in said data storage member when said data processing unit is to communicate with said data storage member; means included in said data storage member responsive to a second signal group representing the actual address of one of said cells for transferring a data word between said cell and said data word transmission member; an address translating device coupled to said plurality of data processing units, said address translating device including means to receive said first signal group and responsive thereto for translating said first signal group into said second signal group; and coupling means for delivering said second signal group to said data storage member.

4. A data processing system comprising: a data word transmission member; a plurality of data storage members for storing a data word in each one of a respective plurality of addressable storage cells; a plurality of data processing units for receiving data words from said data word transmission member, for performing a plurality of different operations on received data words, and for transferring data words representing the results of the operations to said data word transmission member, each of said data processing units including means for supplying a first signal group symbolically representing an address of a cell in said plurality of data storage members when said data processing unit is to communicate with said data storage members; means included in each of said data storage members responsive to a second signal group representing the actual address of one of said plurality of cells in said data storage members for transferring a data word between said cell and said data word transmission member; an address translating device coupled to said data processing unit, said address translating device including means to receive said first signal group and responsive thereto for translating said first signal group into said second signal group; and coupling means for delivering said second signal group to said data storage members.

5. The data processing system of claim 2 wherein said coupling means includes means to deliver each of said second signal groups to the one of said data storage members comprising said cell represented by said second signal group.

6. The data processing system of claim 4 wherein said coupling means includes means to deliver each of said second signal groups to the one of said data storage members comprising said cell represented by said second signal group.

7. A data processing system comprising: a data word transmission member; a data storage system for storing a data word in each one of a plurality of addressable storage cells; a plurality of data processing units for receiving data words from said data word transmission member, for performing a plurality of different operations on received data words, and for transferring data words representing the results of the operations to said data word transmission member, each of said data processing units including means for supplying a signal set when said data processing unit is to communicate with said data storage system, said signal set comprising a first signal group symbolically representing an address of a cell in said data storage system; means included in said data storage system responsive to a second signal group representing the actual address of one of said cells for transferring a data word between said cell and said data word transmission member; an address translating device for translating a received first signal group into a corresponding second signal group; control means responsive to said signal sets for delivering one of a plurality of different output signals representing said data processing units in accordance with the priority of the data processing units delivering said signal sets; means responsive to said one output signal for delivering said first signal group supplied by the corresponding data processing unit to said address translating device; and coupling means for delivering said second signal group to said data storage system.

8. The data processing system of claim 7 wherein said control means includes means for delivering the one of said output signals corresponding to the data processing unit having the highest priority of data processing units delivering said signal sets.

9. The data processing system of claim 7 wherein said control means includes means for delivering said output signals in sequence according to the priorities of data processing units delivering said signal sets.

10. A data processing system comprising: a data word transmission member; a data storage system for storing a data word in each one of a plurality of addressable storage cells; a plurality of data processing units for receiving data words from said data word transmission member, for performing a plurality of different operations on received data words, and for transferring data words representing the results of the operations to said data word transmission member, each of said data processing units including means for supplying a first signal group symbolically representing an address of a cell in said data storage system when said data processing unit is to communicate with said data storage system; said data storage system including means responsive to a second signal group representing the actual address of one of said cells for transferring a data word between said cell and said data word transmission member; an address translating device coupled to said data processing units, said address translating device including means to receive said first signal groups and responsive thereto for translating said first signal groups into corresponding second signal groups; a storage register for each of said data processing units; means coupled to said translating device for transferring each of the second signal groups delivered thereby to the one of said registers assigned to said data processing unit supplying a corresponding first signal group; and transferring means for transferring the second signal groups stored in said registers to said data storage system.

11. The data processing system of claim 10 wherein said data storage system comprises a plurality of data storage members, each of said members including means for storing a data word in each one of a respective plurality of addressable storage cells; and wherein said transferring means includes means for effecting the transfer of each one of said second signal groups stored in said storage registers to the one of said data storage members comprising the corresponding cell.

12. A data processing system comprising: a data word transmission member; a data storage system for storing a data word in each one of a plurality of addressable storage cells; a plurality of data processing units for receiving data words from said data words transmission member, for performing a plurality of different operations on received data words, and for transferring data words representing the results of the operation to said data word transmission member, each of said data processing units including means for supplying a signal set when said data processing unit is to communicate with said data storage system, said signal set comprising a first signal group symbolically representing an address of a cell in said data storage system, each of said data processing units being assigned a different priority; said data storage system including means responsive to a second signal group representing the actual address of one of said cells for transferring a data word between said cell and said data word transmission member; an address translating device for translating a received first signal group into a corresponding second signal group; control means responsive to said signal sets for delivering output signals respectively representing said data processing units, said control means including means for delivering said output signals in sequence according to the priority of the data processing units delivering said signal sets; means responsive to each of said output signals for applying a first signal group supplied by a corresponding data processing unit to said address translating device; a storage register for each of said data processing units; means coupled to said address translating device for transferring each of said second signal groups delivered thereby to the one of said registers assigned to a data processing unit supplying a corresponding first signal group; and transferring means for transferring said second signal groups stored in said registers to said data storage system.

13. A data processing system comprising: a data word transmission member; at least one data storage member for storing a data word in each one of a plurality of addressable storage cells; at least one data processing unit for receiving data words, for performing a plurality of different operations on received data words, and for transferring data words representing the results of the operation to said data word transmission member, said data processing unit including means for supplying a first signal group symbolically representing the address of a cell in said data storage member when said data processing unit is to communicate with said data storage member; means included in said data storage member responsive to a second signal group representing the actual address of one of said cells for transferring a data word between said cell and said data word transmission member; an address translating device coupled to said data processing unit, said address translating device including means to receive said first signal group and responsive thereto for translating said first signal group into said second signal group; and coupling means for delivering said second signal group to said data storage member.

14. A data processing system comprising: a data word transmission member; at least one data storage member for storing a data word in each one of a plurality of addressable storage cells; at least one data processing unit for receiving data words from said data word transmission member, for performing a plurality of different operations on received data words, and for transferring data words representing the results of the operation to said data word transmission member, said data processing unit including means for supplying a first signal group representing a portion of the address of a cell in said data storage member when said data processing unit is to communicate with said data storage member; said data storage member including means responsive to a second signal group representing the complete address of one of said cells for transferring a data word between said cell and said data word transmission member; an address translating device coupled to said data processing unit for receiving said first signal group and responsive thereto for translating said first signal group into a third signal group, said third signal group comprising a portion of said second signal group; and coupling means for delivering said second signal group to said data storage member.

15. A data processing system comprising: a data word transmission member; at least one data storage member for storing a data word in each one of a plurality of for receiving data words from said data word transmission addressable storage cells; at least one data processing unit member, for performing a plurality of different operations on received data words, and for transferring data words representing the results of the operations to said data word transmission member, said data processing unit including means for supplying a first signal group symbolically representing an address of a cell in said data storage member when said data processing unit is to commuicate with said data storage member, said first signal group comprising a first signal subgroup symbolically identifying a block of contiguously addressable cells in said data storage member and a second signal subgroup representing the relative location of a cell within one of said blocks; said data storage member including means responsive to a second signal group representing an actual address of one of said cells for transferring a data word between said cell and said data word transmission member, said second signal group comprising said second signal subgroup and a third signal subgroup actually identifying one of said blocks; means for transferring said second signal subgroup from said data processing unit to said data storage member; an address translating device coupled to said data processing unit, said address translating device including means to receive said first signal subgroup and responsive thereto for translating said first signal subgroup into said third signal subgroup; and coupling means for delivering said third signal subgroup to said data storage member.

16. The data sprocessing system of claim 15 wherein said third signal subgroup represents the actual address of the first cell of one of said blocks.

17. The data processing system of claim 15 wherein said first signal subgroup symbolically represents the address of the first cell of one of said blocks and said third signal subgroup represents the actual address of the first cell of one of said blocks.

18. A data processing system comprising: a data word transmission member; a plurality of data storage members, each of said data storage members storing a data word in each one of a respective plurality of addressable storage cells; at least one data processing unit for receiving data words from said data word transmission member, for performing a plurality of different operations on received data words, and for transferring data words representing the results of the operations to said data word transmission member, said data processing unit including means for supplying a first signal group symbolically representing an address of a cell in said plurality of data storage members when said data processing unit is to communicate with said data storage members; means included in each of said data storage members responsive to a second signal group representing the actual address of one of said cells in said data storage member for transferring a data word between said cell and said data word transmission member; an address translating device coupled to said data processing unit, said address translating device including means to receive said first signal group and responsive thereto for translating said first signal group into said second signal group; further means included in said address translation device for generating an identification signal representing one of said storage members; and means coupled to receive said identification signal and responsive thereto for delivering said second signal group to the one of said data storage members represented by said identification signal.

19. A data processing system comprising: a data word transmission member; a plurality of data storage members, each of said data storage members storing a data word in each one of a respective plurality of addressable storage cells; at least one data processing unit for receiving data words from said data word transmission member, for performing a plurality of different operations on received data words, and for transferring data words representing the results of the operations to said data word transmission member, said data processing unit including means for supplying a first signal group symbolically representing an address of a cell in said plurality of data storage members when said data processing unit is to communicate with said data storage members, said first signal group comprising a first signal subgroup symbolically identifying a block of contiguously addressable cells in said data storage members and a second signal subgroup representing the relative location of a cell in one of said blocks; means included in each of said data storage members responsive to a second signal group representing the actual address of one of the cells in said data storage member for transferring a data word between said cell and said data word transmission member, said second signal group comprising said second signal subgroup and a third signal subgroup actually identifying one of said blocks; an address translating device coupled to said data processing unit, said address translating device including means to receive said first signal subgroup and responsive thereto for translating said first signal subgroup into one of said third signal subgroups and an identification signal representing one of said data storage members; and means coupled to receive said identification signal and responsive thereto for transferring the corresponding second and third signal subgroups to the one of said data storage members represented by said identification signal.

20. A data processing system comprising: a data word transmission member; a plurality of data storage members for storing a data word in each of a respective plurality of addressable storage cells; a plurality of data processing units for receiving data words from said data word transmission member, for performing a plurality of different operations on received data words, and for transferring data words representing the results of the operations to said data word transmission member, each of said data processing units including means for supplying a first signal group symbolically representing an address of a cell in said plurality of data storage members when said data processing unit is to communicate with said data storage members; each of said data storage members including means responsive to a second signal group representing the actual address of one of the cells in said data storage member for transferring a data word between said cell and said data word transmission member; an address translating device coupled to said data processing units, said address translating device including means to receive said first signal groups and responsive thereto for translating each of said first signal groups into corresponding signal pluralities, each of said signal pluralities comprising one of said second signal groups and an identification signal representing one of said data storage members; a storage register for each of said data processing units; means coupled to said address translating device for transferring each one of said signal pluralities delivered thereby to the one of said registers assigned to the data processing unit supplying a corresponding first signal group; and means coupled to said registers and responsive to each one of said identification signals stored therein for delivering the corresponding second signal group to the one of said data storage members represented by said identification signal.

21. In combination: an address issuing device; an address responsive device; and an address translating device, said address translating device comprising: means for receiving an address from said address issuing device, means for decoding said address into a unique signal, means for encoding said unique signal into a group of signals, and means for transferring said group of signals to said address responsive device.

22. In combination: an address issuing device; a plurality of address responsive devices; and an address translating device, said address translating device comprising: means for receiving an address from said address issuing device, means for decoding said address into a unique signal, means for encoding said unique signal into a group of signals, and means for transferring said group of signals to said plurality of address responsive devices.

23. In combination: a plurality of address issuing devices; an address responsive device; and an address translating device, said address translating device comprising: means for receiving an address from each of said address issuing devices, means for decoding said address into a unique signal, means for encoding said unique signal into a group of signals, and means for transferring said group of signals to said address responsive device.

24. In combination: a plurality of address issuing devices; a plurality of address responsive devices; and an address translating device, said address translating device comprising: mean for receiving an address from each of said plurality of address issuing devices, means for decoding said address into a unique signal, means for encoding said unique signal into a group of signals, and means for transferring said group of signals to each of said plurality of address responsive devices.

25. In combination: an address issuing device; a plurality of address responsive devices; and an address translating device, said address translating device comprising: means for receiving an address from said address issuing device, means for decoding said address into a unique signal, means for encoding said unique signal into a group of signals, and means for transferring said group of signals to a selected one of said address responsive devices.

26. In combination: a plurality of address issuing devices; a plurality of address responsive devices; and an address translating device, said address translating device comprising means for receiving an address from each of said address issuing devices, means for decoding said address into a unique signal, means for encoding said unique signal into a group of signals, and means for transferring said group of signals to a selected one of said address responsive devices.

27. In combination: a plurality of address issuing devices; at least one address responsive device; control means for receiving addresses from each of said address issuing devices, said control means including means responsive to said addresses for delivering one of a plurality of different output signals representing the address issuing devices in accordance with the priority of the address issuing devices delivering said addresses; an address translating device; means responsive to said one output signal for supplying an address issued by the corresponding address issuing device to said address translating device; said address translating device comprising: means for receiving said address, means for decoding said address into a unique signal, means for encoding said unique signal into a group of signals, and means for transferring said group of signals to said address responsive device.

28. In combination: at least one address issuing device; a plurality of address responsive devices; an address translating device, said address translating device comprising: means for receiving an address from said address issuing device, means for decoding said address into a unique signal, means for encoding said unique signal into a group of signals, means for generating an identification signal representing one of said address responsive devices; and means coupled to receive said identification signal and responsive thereto for delivering said group of signals to the one of said address responsive devices represented by said identification signal.

References Cited

UNITED STATES PATENTS

| | | | |
|---|---|---|---|
| 3,089,125 | 5/1963 | Reynolds | 340—172.5 |
| 3,270,324 | 8/1966 | Meade et al. | 340—172.5 |
| 3,292,151 | 12/1966 | Barnes et al. | 340—172.5 |
| 3,311,887 | 3/1967 | Muroga | 340—172.5 |
| 3,311,888 | 3/1967 | Hanan et al. | 340—172.5 |
| 3,317,898 | 5/1967 | Hellerman | 340—172.5 |
| 3,317,899 | 5/1967 | Chien et al. | 340—172.5 |
| 3,323,109 | 5/1967 | Hecht et al. | 340—172.5 |

PAUL J. HENON, Primary Examiner